US009113335B2

(12) United States Patent
Ponnuswamy

(10) Patent No.: US 9,113,335 B2
(45) Date of Patent: Aug. 18, 2015

(54) DISTRIBUTED LOAD BALANCING IN WIRELESS NETWORKS

(75) Inventor: Subburajan Ponnuswamy, Scotts Valley, CA (US)

(73) Assignee: Aruba Networks Inc., Sunnyvale, CA (US)

( * ) Notice: Subject to any disclaimer, the term of this patent is extended or adjusted under 35 U.S.C. 154(b) by 795 days.

(21) Appl. No.: 12/112,285

(22) Filed: Apr. 30, 2008

(65) Prior Publication Data

US 2009/0274129 A1 Nov. 5, 2009

(51) Int. Cl.
*H04W 36/22* (2009.01)
*H04W 16/08* (2009.01)

(52) U.S. Cl.
CPC .............. *H04W 16/08* (2013.01); *H04W 36/22* (2013.01); *Y02B 60/50* (2013.01)

(58) Field of Classification Search
None
See application file for complete search history.

(56) References Cited

U.S. PATENT DOCUMENTS

| 7,313,403 | B2* | 12/2007 | Gong et al. ................. 455/456.1 |
| 7,706,326 | B2* | 4/2010 | Marinier et al. .............. 370/331 |
| 7,778,220 | B2* | 8/2010 | Sastry ........................... 370/329 |
| 8,050,230 | B2* | 11/2011 | Jechoux ....................... 370/331 |
| 2003/0185172 | A1* | 10/2003 | Rue ............................... 370/331 |
| 2004/0001467 | A1* | 1/2004 | Cromer et al. ................ 370/338 |
| 2005/0128988 | A1* | 6/2005 | Simpson et al. ............. 370/338 |
| 2006/0056348 | A1* | 3/2006 | Marinier et al. .............. 370/331 |
| 2008/0002627 | A1* | 1/2008 | Cha et al. ...................... 370/334 |
| 2008/0144575 | A1* | 6/2008 | Chen et al. .................... 370/331 |
| 2008/0316968 | A1* | 12/2008 | Sun et al. ...................... 370/331 |
| 2010/0014426 | A1* | 1/2010 | Cavalli et al. ................ 370/235 |
| 2010/0202409 | A1* | 8/2010 | Marinier et al. .............. 370/331 |
| 2011/0200008 | A1* | 8/2011 | Carlton ......................... 370/331 |

* cited by examiner

Primary Examiner — Robert C Scheibel

(57) ABSTRACT

Distributed load balancing in wireless digital networks. In a network having a plurality of access nodes with at least one wireless client connected to a first access node, the client is encouraged to move to a different access node by reducing the apparent signal strength of transmissions from the access node to the client. Apparent signal strength can be reduced by reducing transmit power, by using beam forming, antenna switching, or a combination. Other access nodes may send unsolicited frames, such as probe response frames to the client, encouraging the client to move.

15 Claims, 1 Drawing Sheet

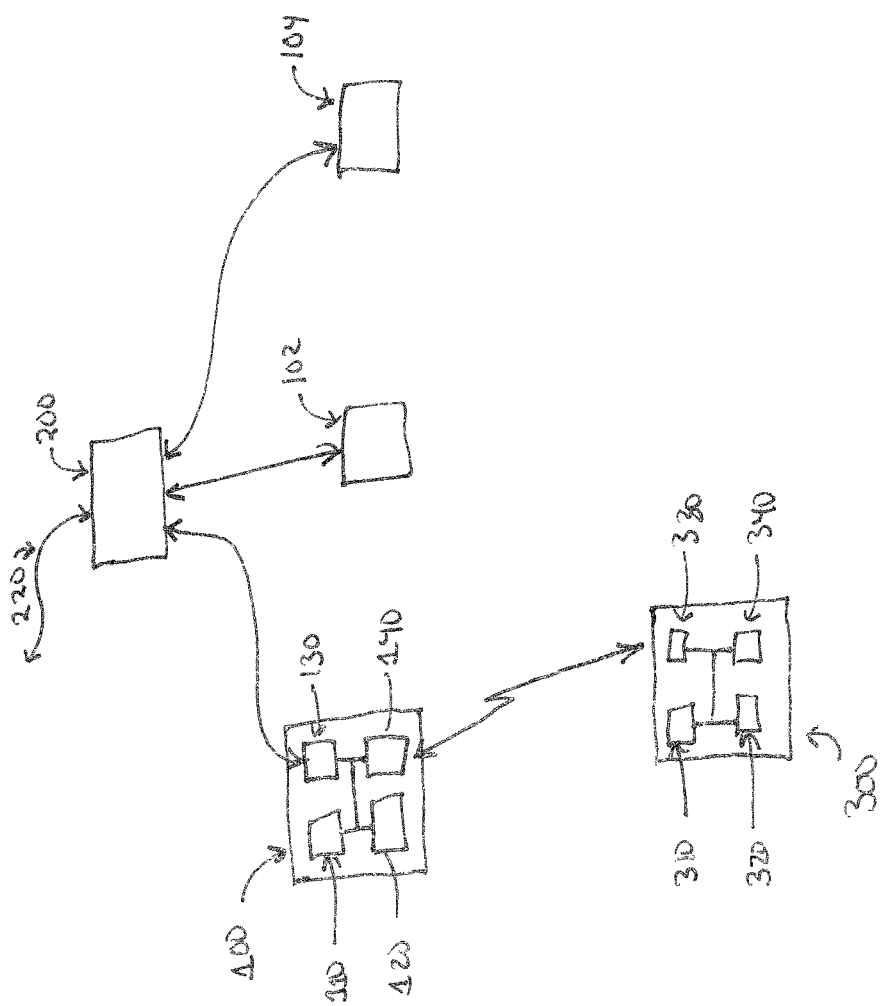

DISTRIBUTED LOAD BALANCING IN WIRELESS NETWORKS

BACKGROUND OF THE INVENTION

The present invention relates to the operation of wireless digital networks, and more particularly to load balancing in wireless digital networks.

A wireless digital network typically comprises a plurality of wireless access nodes providing services to wireless clients. Access nodes may have wired or wireless connections to the services, and may connect to a central controller, or the control function may be distributed among the access nodes. Wireless client devices obtain service by connecting through an access node.

In today's wireless networks, the decision to move a client from one access node to another access node is taken entirely by the client. If an access node wishes to move a currently connected client to another access node, for example to provide better service, to balance loading, or for other reasons, the access node currently connected to the client must actively disconnect or de-authenticate the client, forcing the client to re-connect.

Such active disconnection or de-authentication can result in session timeouts, increased communications latency, increased roaming latency, and dissatisfied users.

What is needed is a method of load balancing in wireless networks that does not rely on active disconnects.

BRIEF DESCRIPTION OF THE DRAWINGS

The invention may be best understood by referring to the following description and accompanying drawings that are used to illustrate embodiments of the invention in which:

FIG. 1 shows a block diagram of an electronic system.

DETAILED DESCRIPTION

Embodiments of the invention relate methods of load balancing in wireless digital networks. In one embodiment, clients are encouraged to move away from their currently connected access node by altering signal strengths. The access node currently supporting the client may reduce transmit power on transmissions to that client. This may be accomplished by reducing transmit power, switching antennas, beam forming, or a combination of these techniques. Other access nodes may increase transmit power, use beam forming, or send unsolicited probe response or other frames to the client, advertising availability.

According to the present invention and as shown in FIG. 1 and the descriptions following, access nodes 100, 102, 104 support wireless clients such as wireless client 300. As is known to the art, access node 100 is a digital device with a central processing unit (CPU) 110, memory hierarchy 120, network interface 130, and wireless interface 140. In one embodiment, CPU 110 is a MPS-class CPU, which may be supplied from companies such as Cavium or Raza Microelectronics. Other CPUs may also be used, such as those from Intel AMD, IBM, and the like. Memory hierarchy 120 contains data and instructions to operate access node 100, and contains both volatile and non-volatile memory elements. As known to the art, high-speed volatile memory such as RAM or DRAM is used to store data and instructions temporarily, while non-volatile memory such as flash, ROM, and/or EPROM is used to store longer duration information such as that required to start up the device, and files for continued operation. Network interface 130 is used to communicate with central services and other access nodes, and is typically a wired Ethernet interface, or a wireless interface such as an IEEE 802.11 wireless interface, a WiMAX or EVDO interface, or the like. Wireless interface 140 is typically an IEEE802.11 wireless interface. Access nodes 100, 102, 104 typically operate under control of an operating system such as a Linux operating system, or other operating system suitable for use in embedded devices, such as VxWorks provided by Wind River systems.

In one embodiment of the invention, access nodes 100, 102, 104 operate cooperatively, communicating through switch 200. In such an embodiment, switch 200, which may be a switch, router, hub, or other network data switching device, does not provide centralized control, but merely assists in the passage of data among devices. In another embodiment of the invention, access nodes 100, 102, 104 connect to a network controller 200, which is a digital system of similar internal architecture to access nodes 100, 102, 104, but usually with increased capability, and provides centralized management and control of a plurality of wireless access nodes 100, 102, 104.

Wireless client device 300 is similarly a digital system comprising CPU 310, memory hierarchy 320, wireless interface 330, and peripherals 340. Wireless client 300 may be a device such as an Wi-Fi phone, a hand-held wireless scanner, a hand-held or laptop computer, or other wireless device. In such a wireless device, the choice of CPU 310 will depend on the chosen function. CPUs from Intel and AMD are popular for laptop computers, for example. Memory hierarchy 320, while containing a mix of non-volatile and volatile memory elements, will also be formed for the desired function, with hard disk drives and large non-volatile solid state memories used in laptops, while other devices may use compact flash and other non-volatile devices in addition to high-speed volatile memories such as DRAM. Wireless interface 330 is typically an IEEE 802.11 Wi-Fi interface for communicating with access nodes 100, 102, 104 and similar wireless devices. Peripherals 340 may include keyboards, displays, purpose built scanners for devices such as hand-held wireless scanners, pointing devices, and the like.

In operation, client 300 accesses information wirelessly through interfaces 330, 140, in this example according to IEEE802.11 standards. Client 300 establishes a connection with an access node, in this example with access node 100, which provides access to required data and services. As known in the art in current wireless networks, the decision to move from one access node to another, say from access node 100 to access node 102, is taken entirely by client 300.

If access node 100 wishes to move client 300 to another access node, it must actively disconnect or de-authenticate client 300, forcing client 300 to reconnect somewhere else. Those familiar with the art will understand that such disconnection and/or de-authentication will usually happen at the worst possible time according to client 300 and its user, resulting in session timeouts, lost data, broken connections, increased latency, and unhappy users.

The decision to move a client from one access node to another may be made for a myriad of reasons, among them load balancing, providing better response, and the like. As examples, access nodes may be configured to handle a maximum pre-determined number of clients per access node, or a pre-determined ratio of clients over a set of access nodes. Clients may be moved among access nodes to group those clients based on actual or projected load, or PHY type, or other capabilities. Clients may be moved among access nodes based on traffic type; as an example, it may be beneficial to group voice clients together on one or more access nodes, and on non-DFS channels. The reasoning behind the decision to move a client away from a particular access node is not important to understanding the present invention.

According to the present invention, a client connected to an access node is encouraged to move to another access node by altering signal strengths so that the client will move to another access node. This takes advantage of the client's use of signal strength as an important criteria used to choose among access nodes, as observed in beacon or other frames.

In one embodiment of the invention, transmit power on frames sent to at least a particular client is lowered. In the example of FIG. 1, access node 100 would lower transmit power through wireless interface 140 on at least the frames sent to client 300. Lower transmit power means lower received signal strength. While it is preferable that only the frames sent to the particular client, such as client 300, be sent at a lower power level, some access nodes may not allow this fine a granularity of transmit power control. It may be useful or necessary to reduce transmit power in a series of steps.

In another embodiment of the invention, with access nodes supporting beamforming, or having switchable antennas such as sectorized antennas, the signal strength seen by the client may be reduced by switching antennas or antenna patterns in at least the frames transmitted to that client such that the client sees signals with lower signal strength. Beamforming and/or antenna switching techniques may also be used by other access nodes to present stronger signals to the targeted client.

In another embodiment of the invention, one or more access nodes operating on the same channel may be commanded to send unsolicited probe responses or similar frames which indicate availability and/or capability to the client, in essence advertising their availability. In one embodiment, such coordination among access nodes may be coordinated by the access node currently supporting the wireless client. In another embodiment where the access nodes are connected and operated by a central controller, such coordination is mediated by the central controller.

While the invention has been described in terms of various embodiments, the invention should not be limited to only those embodiments described, but can be practiced with modification and alteration within the spirit and scope of the appended claims. The description is this to be regarded as illustrative rather than limiting.

I claim:

1. A computer implemented method, comprising:
   determining, at a computing device, that a condition is met for transferring a wireless client to a subsequent wireless access node of a wireless network, wherein the wireless client is connected to an initial wireless access node on the wireless network, and wherein the initial wireless access node and the subsequent wireless access node are compliant with an IEEE 802.11 specification;
   altering a transmission characteristic of the initial wireless access node, wherein altering includes decreasing a received signal strength at the wireless client;
   generating a command to broadcast an advertisement frame that indicates availability of the subsequent wireless access node to a new wireless client, wherein receiving the command at the subsequent wireless access node causes the subsequent wireless access node to broadcast the advertisement frame, and wherein receiving the advertisement frame at the wireless client facilitates connection of the wireless client to the subsequent wireless access node; and
   coordinating transfer of the wireless client from the initial wireless access node to the subsequent wireless access node, wherein coordinating includes transmitting the command, wherein receiving the command at the subsequent wireless access node facilitates the transfer of the wireless client, wherein coordinating includes altering a transmission characteristic of the subsequent wireless access node, and wherein altering the transmission characteristic of the subsequent wireless access node includes increasing a wireless signal strength of the subsequent wireless access node received at the wireless client.

2. The method of claim 1, wherein the transmission characteristic of the subsequent wireless access node is a transmit power.

3. The method of claim 1, wherein the transmission characteristic of the initial wireless access node is a transmit power.

4. The method of claim 1, wherein altering includes decreasing a transmit power of the initial wireless access node in a series of steps.

5. The method of claim 1, wherein the subsequent wireless access node is one of a plurality of subsequent wireless access nodes and wherein each of the plurality of subsequent wireless access nodes operate on a same IEEE 802.11 wireless channel.

6. A system comprising:
   one or more processors;
   a non-transitory computer readable medium communicatively coupled to the one or more processors, the non-transitory computer readable medium including instructions that, when executed by the one or more processors, cause the one or more processors to perform operations including:
      determining that a condition is met for transferring a wireless client to a subsequent wireless access node of a wireless network, wherein the wireless client is connected to an initial wireless access node on the wireless network, and wherein the initial wireless access node and the subsequent wireless access node are compliant with an IEEE 802.11 specification;
      altering a transmission characteristic of the initial wireless access node, wherein altering includes decreasing a received signal strength at the wireless client;
      generating a command to broadcast an advertisement frame that indicates availability of the subsequent wireless access node to a new wireless client, wherein receiving the command at the subsequent wireless access node causes the subsequent wireless access node to broadcast the advertisement frame, and wherein receiving the advertisement frame at the wireless client facilitates connection of the wireless client to the subsequent wireless access node; and
      coordinating transfer of the wireless client from the initial wireless access node to the subsequent wireless access node, wherein coordinating includes transmitting the command, wherein receiving the command at the subsequent wireless access node facilitates the transfer of the wireless client, wherein coordinating includes altering a transmission characteristic of the subsequent wireless access node, and wherein altering the transmission characteristic of the subsequent wireless access node includes increasing a wireless signal strength of the subsequent wireless access node received at the wireless client.

7. The system of claim 6, wherein the transmission characteristic of the subsequent wireless access node is a transmit power.

8. The system of claim 6, wherein the transmission characteristic of the initial wireless access node is a transmit power.

9. The system of claim 6, wherein altering includes decreasing a transmit power of the initial wireless access node in a series of steps.

10. The system of claim 6, wherein the subsequent wireless access node is one of a plurality of subsequent wireless access nodes and wherein each of the plurality of subsequent wireless access nodes operate on a same IEEE 802.11 wireless channel.

11. A non-transitory computer readable medium comprising instructions that, when executed by one or more processors, cause the one or more processors to perform operations including:
  determining that a condition is met for transferring a wireless client to a subsequent wireless access node of a wireless network, wherein the wireless client is connected to an initial wireless access node on the wireless network, and wherein the initial wireless access node and the subsequent wireless access node are compliant with an IEEE 802.11 specification;
  altering a transmission characteristic of the initial wireless access node, wherein altering includes decreasing a received signal strength at the wireless client;
  generating a command to broadcast an advertisement frame that indicates availability of the subsequent wireless access node to a new wireless client, wherein receiving the command at the subsequent wireless access node causes the subsequent wireless access node to broadcast the advertisement frame, and wherein receiving the advertisement frame at the wireless client facilitates connection of the wireless client to the subsequent wireless access node; and
  coordinating transfer of the wireless client from the initial wireless access node to the subsequent wireless access node, wherein coordinating includes transmitting the command, wherein receiving the command at the subsequent wireless access node facilitates the transfer of the wireless client, wherein coordinating includes altering a transmission characteristic of the subsequent wireless access node, and wherein altering the transmission characteristic of the subsequent wireless access node includes increasing a wireless signal strength of the subsequent wireless access node received at the wireless client.

12. The medium of claim 11, wherein the transmission characteristic of the initial wireless access node is a transmit power.

13. The medium of claim 11, wherein the transmission characteristic of the subsequent wireless access node is a transmit power.

14. The medium of claim 11, wherein altering includes decreasing a transmit power of the initial wireless access node in a series of steps.

15. The medium of claim 11, wherein the subsequent wireless access node is one of a plurality of subsequent wireless access nodes and wherein each of the plurality of subsequent wireless access nodes operate on a same IEEE 802.11 wireless channel.

* * * * *